United States Patent
Kipnis

(10) Patent No.: US 12,377,972 B2
(45) Date of Patent: Aug. 5, 2025

(54) VEHICLE HAVING MULTIPLE CONFIGURATIONS INCLUDING ROAD CONFIGURATION AND FLYING CONFIGURATION BASED UPON ROTOR POSITION

(71) Applicant: Boris Kipnis, Tel Aviv (IL)

(72) Inventor: Boris Kipnis, Tel Aviv (IL)

(73) Assignee: Boris Kipnis, Tel Aviv (IL)

( * ) Notice: Subject to any disclaimer, the term of this patent is extended or adjusted under 35 U.S.C. 154(b) by 9 days.

(21) Appl. No.: 17/916,753

(22) PCT Filed: Apr. 3, 2021

(86) PCT No.: PCT/IL2021/050371
§ 371 (c)(1),
(2) Date: Oct. 3, 2022

(87) PCT Pub. No.: WO2021/199051
PCT Pub. Date: Oct. 7, 2021

(65) Prior Publication Data
US 2023/0144699 A1    May 11, 2023

Related U.S. Application Data

(60) Provisional application No. 63/006,091, filed on Apr. 7, 2020, provisional application No. 63/004,556, filed on Apr. 3, 2020.

(51) Int. Cl.
*B60F 5/02* (2006.01)
*B60K 6/20* (2007.10)
(Continued)

(52) U.S. Cl.
CPC ............. *B60F 5/02* (2013.01); *B60K 6/20* (2013.01); *B64C 27/08* (2013.01); *B64C 27/50* (2013.01);
(Continued)

(58) Field of Classification Search
CPC . B60F 5/05; B64C 37/00; B64C 27/12; B64C 27/22; B64C 27/26; B64C 29/0025; B64D 35/024
See application file for complete search history.

(56) References Cited

U.S. PATENT DOCUMENTS 2,445,354 A * 7/1948 Hoppes .................... B64C 27/12
244/17.23
3,246,861 A * 4/1966 Curci ................... B64C 29/0033
244/17.23
(Continued)

FOREIGN PATENT DOCUMENTS

CN   101612870 A  * 12/2009
CN   101612870 B    9/2013
(Continued)

OTHER PUBLICATIONS

"Landing on a Road," Ben Sclair, General Aviation News, Jul. 18, 2019 (Year: 2019).*
(Continued)

*Primary Examiner* — Joshua J Michener
*Assistant Examiner* — Ryan Andrew Yankey
(74) *Attorney, Agent, or Firm* — Snell & Wilmer LLP

(57) ABSTRACT

A roadable VTOL flying vehicle having a road-configuration and a flight-configuration. The roadable VTOL flying vehicle includes a roadable vehicle; at least one rotor having at least one blade, the rotor is rotatably attached to an upper section of the roadable vehicle of the flying vehicle; at least one motor configured to operatively rotate the least at least one rotor; at least one angular position sensor configured to detect the angular position of each of the at least one rotor; and a vehicle control sub-system configured to affect automatic transformation of the flying vehicle from the road-configuration to the flight-configuration and from the flight-configuration to the road-configuration, wherein the vehicle (Continued)

control sub-system is configured bring the at least one rotor into a parking state, when in road-configuration.

18 Claims, 13 Drawing Sheets

(51) Int. Cl.
*B64C 27/08* (2023.01)
*B64C 27/50* (2006.01)
*B64C 37/00* (2006.01)
*B64D 17/80* (2006.01)
*B64D 35/023* (2025.01)
*B64D 35/024* (2025.01)
*B64D 35/04* (2006.01)
*H01M 10/46* (2006.01)

(52) U.S. Cl.
CPC .............. *B64C 37/00* (2013.01); *B64D 17/80* (2013.01); *B64D 35/023* (2024.01); *B64D 35/024* (2024.01); *B64D 35/04* (2013.01); *H01M 10/46* (2013.01); *H01M 2220/20* (2013.01)

(56) References Cited

U.S. PATENT DOCUMENTS

| | | | | |
|---|---|---|---|---|
| 6,745,977 B1* | 6/2004 | Long | ....................... | B64C 27/56 244/221 |
| 11,524,778 B2* | 12/2022 | Saias | ....................... | B64C 37/00 |
| 11,639,217 B2* | 5/2023 | Simon | ..................... | B64C 27/22 244/7 A |
| 2006/0054737 A1* | 3/2006 | Richardson | ............. | B64C 27/18 244/17.11 |
| 2008/0067284 A1* | 3/2008 | Bakker | .................... | B62K 5/10 244/17.11 |
| 2010/0086404 A1* | 4/2010 | Thomassey | ............ | B64C 27/12 416/34 |
| 2015/0028152 A1* | 1/2015 | Eller | ..................... | B64C 27/008 244/17.13 |
| 2016/0052626 A1* | 2/2016 | Vander Mey | ........... | B64C 27/20 244/6 |
| 2019/0100303 A1* | 4/2019 | Campbell | ............... | B64C 27/26 |

FOREIGN PATENT DOCUMENTS

| | | | | |
|---|---|---|---|---|
| CN | 109501539 A | | 3/2019 | |
| CN | 110744978 A | * | 2/2020 | |
| GB | 2507489 A | * | 5/2014 | ............... B60F 3/00 |

OTHER PUBLICATIONS

International Search Report and Written Opinion for PCT application No. PCT/IL2021/050371, issued on Jun. 30, 2021, 8 pages.
English Abstracts for CN 101612870, 5 pages.
English Abstracts for CN 110744978, 8 pages.
English Abstracts for CN 109501539, 5 pages.

* cited by examiner

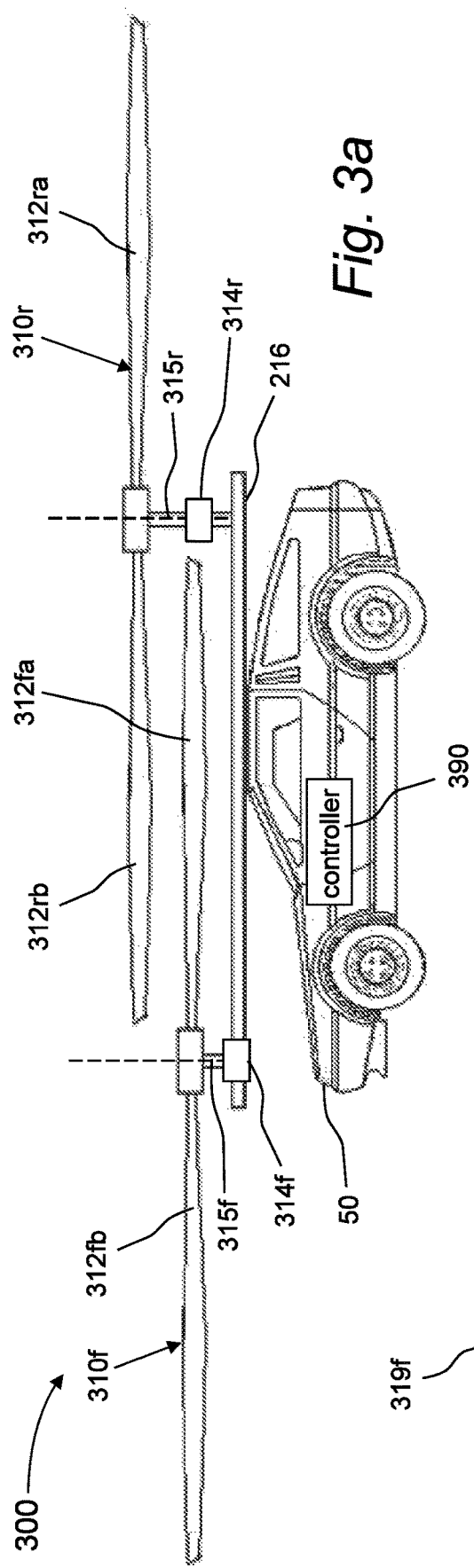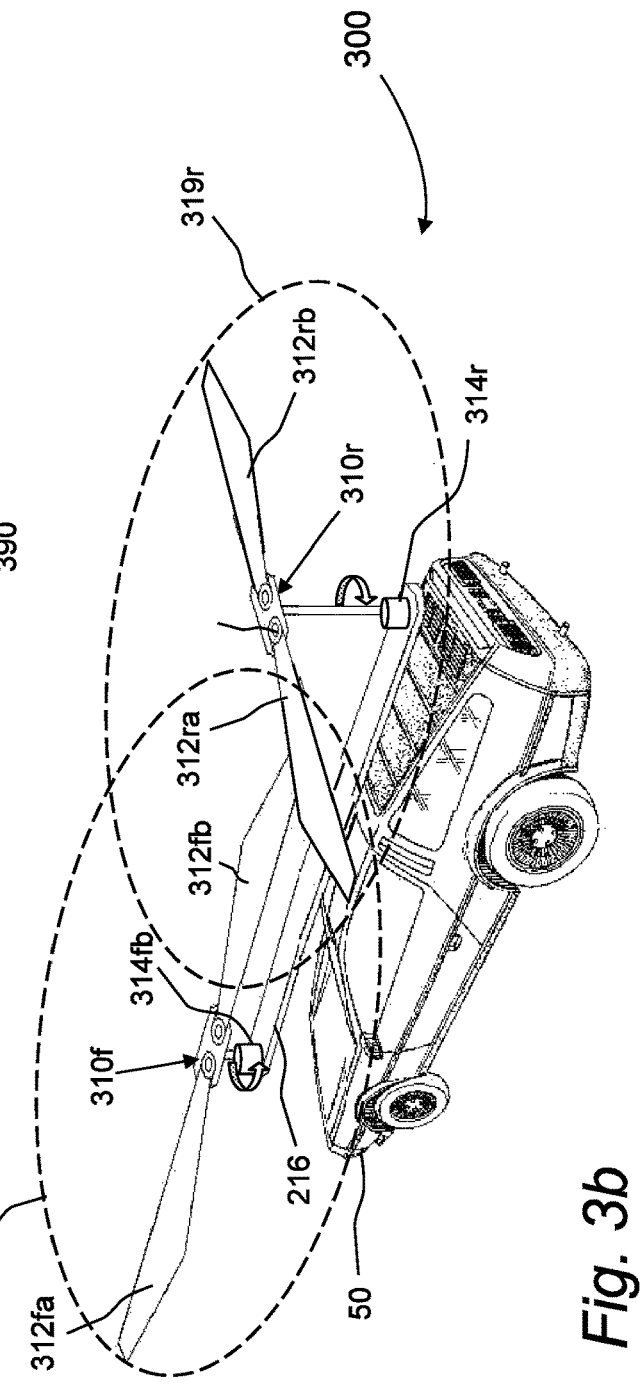

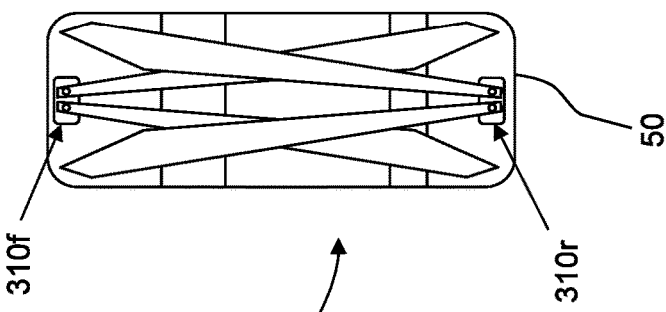
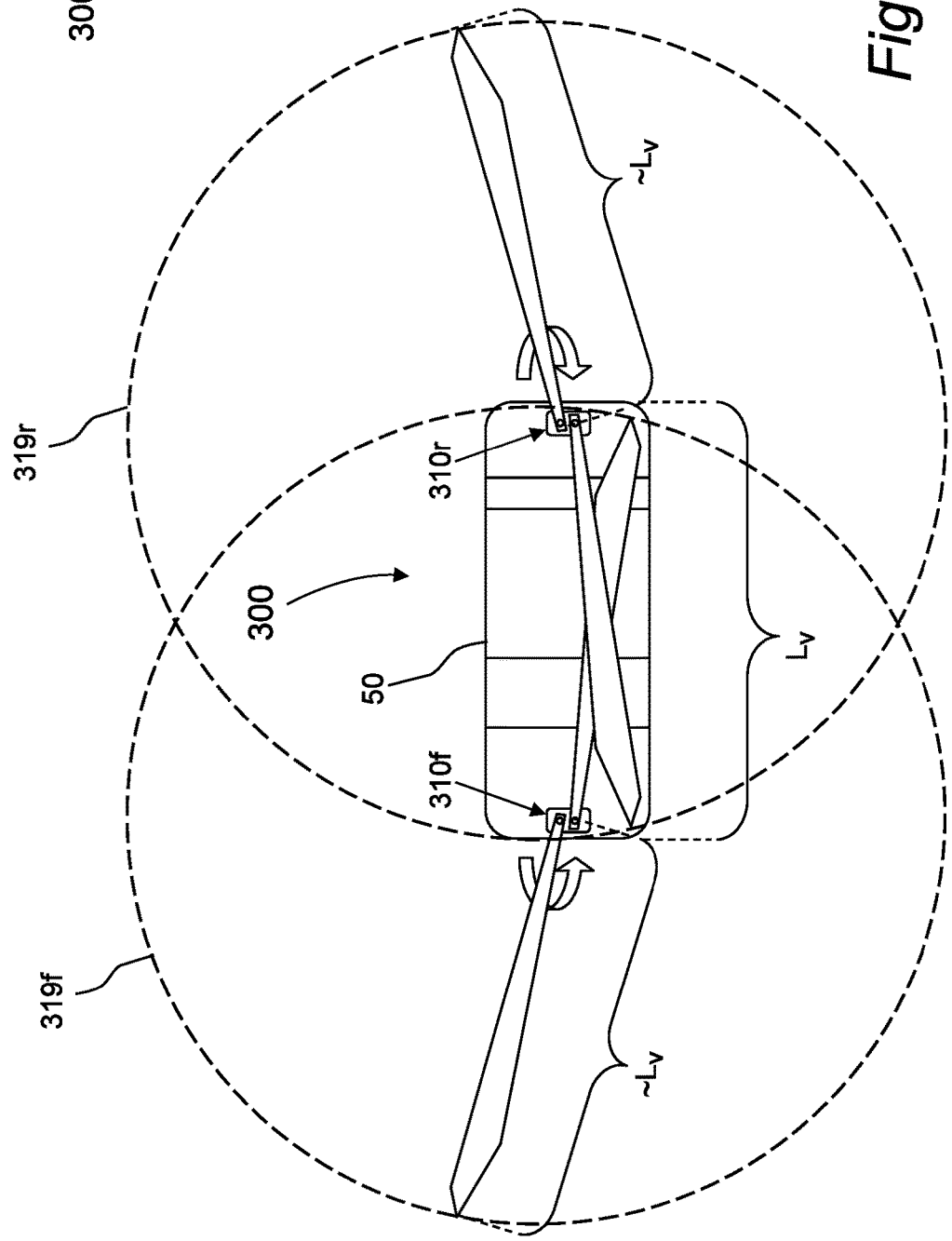
Fig. 3c
Fig. 3d

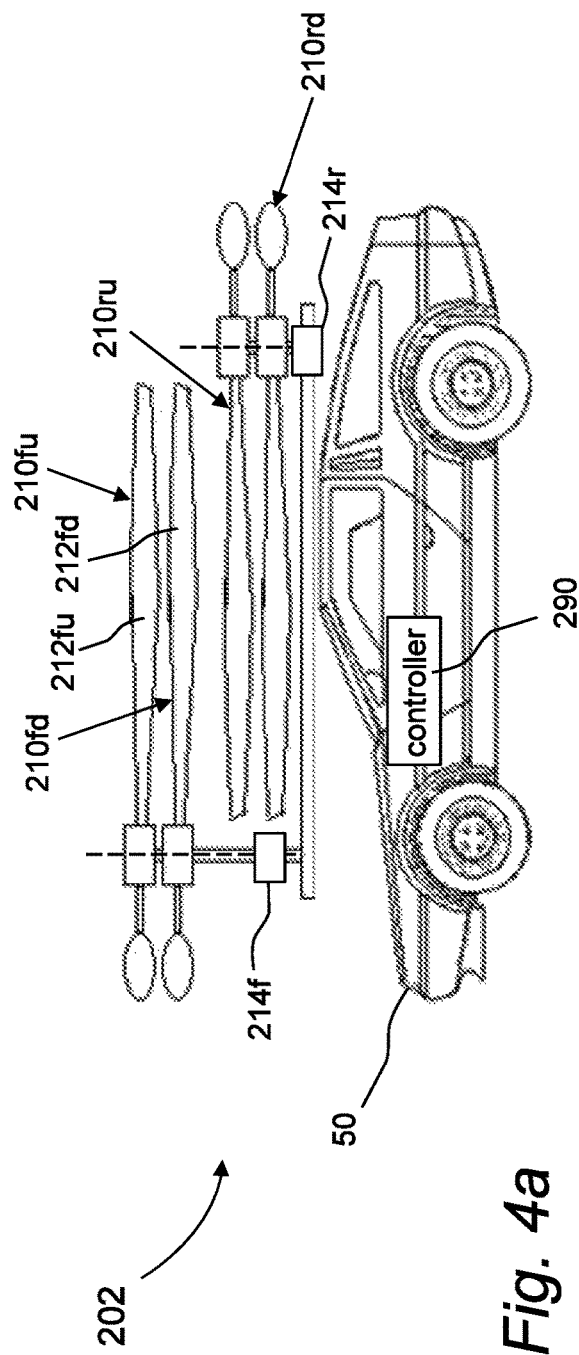
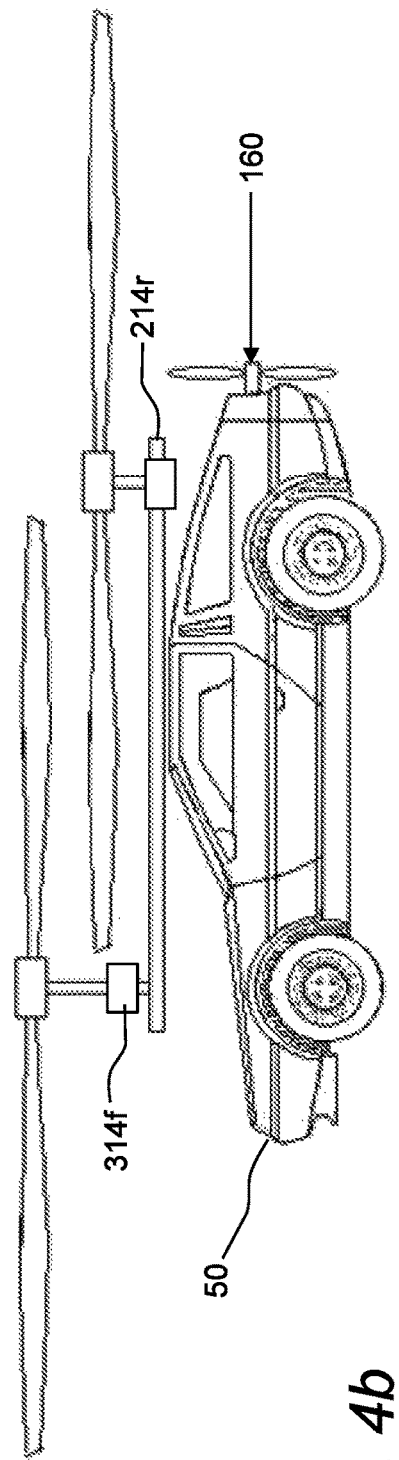

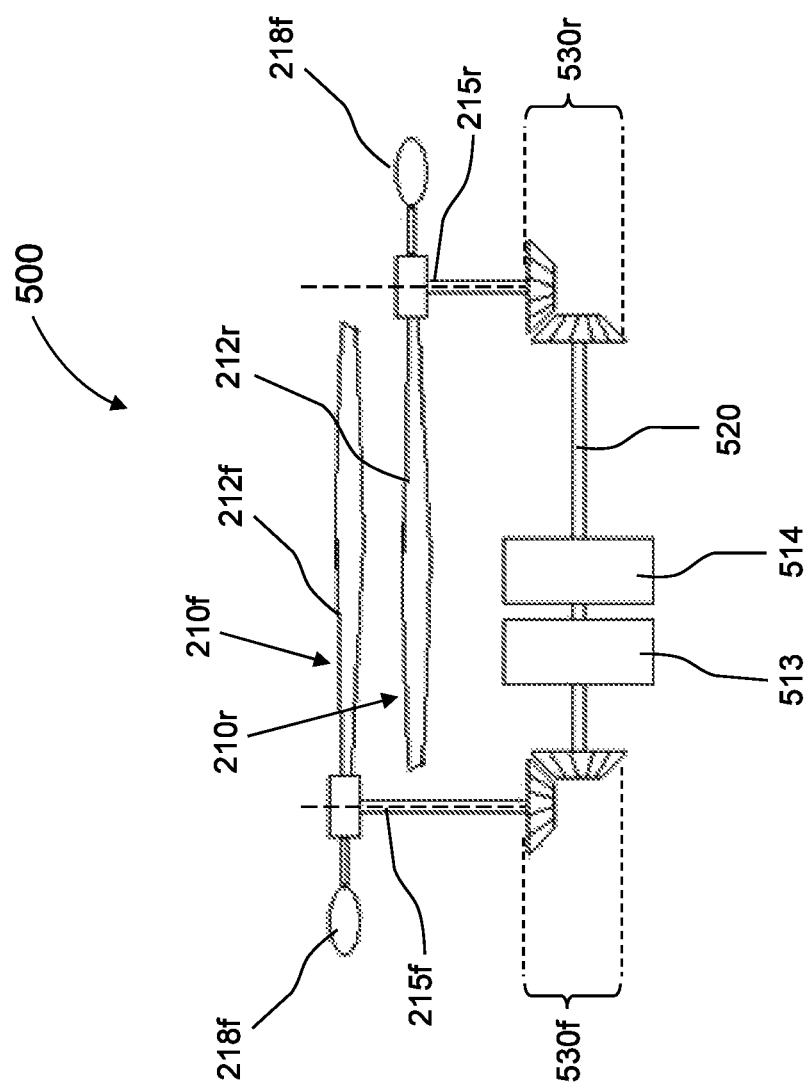

VEHICLE HAVING MULTIPLE CONFIGURATIONS INCLUDING ROAD CONFIGURATION AND FLYING CONFIGURATION BASED UPON ROTOR POSITION

CROSS-REFERENCE TO RELATED APPLICATIONS

The present application is a national stage entry of PCT/IL2021/050371 filed Apr. 3, 2021, which claims the benefit of and priority to U.S. Provisional Patent Application No. 63/004,556, filed Apr. 3, 2020 and U.S. Provisional Patent Application No. 63/006,091, filed Apr. 7, 2020, all of which are hereby incorporated by reference in their entirety.

FIELD OF THE INVENTION

The present disclosure relates to Vertical Take-Off and Landing (VTOL) flying cars, and more particularly to roadable VTOL flying cars configured to take off, fly and land like helicopters or gyrocopters using single main rotor configuration or twin rotor configuration with clockwise (CW) and counter-clockwise (CCW) tandem rotors and/or coaxial rotors, having improved efficiency and a simple folding mechanism.

BACKGROUND

Since the Wright brothers first manned flight people dream for compact flying vehicle "flying car" to be able to fly over the air without roads or traffic jams with vertical takeoff and landing capability like in the "Back to the future" movie, but this challenge become very complicated due to the air vehicle physical size and energy/fuel consumption, wherein the air vehicle efficiency for both fixed-wings (airplanes) and rotary-wings (helicopter/gyrocopter) depends on ratio between takeoff weight and wings/rotor surface area and significantly degrades performance when this ratio become high. Some prior art "flying car" are described in US patents U.S. Pat. Nos. 8,511,603, 6,745,977, 6,457,670 and U.S. Ser. No. 10/518,595, as well as in US patent application US20080067284.

As result all known in the art compact "flying car" prototypes suffer from efficiency problems or may have a very complicated folding mechanism for wings/rotor folding and as result are very expensive, dangerous and have limited flight time.

The state-of-the-art flying cars prototypes divided in two main categories:
1. Small flying vehicles without roading capability.
2. Foldable air vehicles with roading capability.

The category (1) flying vehicles are commonly using known in art VTOL schemes like (a) helicopters by making them small form factor (for example GEN H-4 helicopter) or like (b) multi rotor copters with 2 or more fixed pitch rotors using drone scheme in large form factor (for example "hoversurf scorpion 3" known also known in art as hoverbike), wherein both of this vehicles types have high weight to rotor surface ratio and as result they suffer from low efficiency that cause many problems like: low flight duration (usually up to 20 min), low takeoff weight (can carry only 1 person), high operational cost and safety issues.

The category (2) flying vehicles are subdivided into several categories such as:
a. Roadable aero plane—this type can use (a) foldable fixed wings scheme like (Terrafugia, "Samson switchblade" and others) or (b) rotatory wing gyrocopters like (PAL-V and others), this vehicle type suffers from complicated folding mechanism that effect on cost and safety of flight and don't have VTOL capability that makes it necessary to use runways for takeoff and landing.
b. Roadable aero planes with vertical takeoff and landing capability that includes foldable wings and rotors, this type of vehicles are so complicated that up to date nobody made a full-scale working prototype while even if do so this vehicle type will suffer from many problems including safety and cost.
c. Roadable helicopters, such as described in U.S. Pat. No. 5,915,649 and like—this type of vehicles uses classic helicopter scheme, where the foldable mechanism is mechanical and thereby complex, wherein the main single rotor or coaxial counterrotating rotors are located at the middle of the vehicle. This type of prior art vehicles provides very complicated folding mechanisms, and additional complexity in the form of the mechanical folding and unfolding mechanism of the main rotor, where each blade has a separate folding/unfolding mechanism located at the middle of the blades and as result each blade suffers from high mechanical stress. As result, these types of vehicles are yet to show a full-scale working prototype.

There is therefore a need, and it would be advantageous to provide roadable VTOL flying vehicles that are configured to take off, fly and land like helicopters or gyrocopters, as well as drive on common roads like common cars. It would be advantageous to provide the roadable VTOL flying vehicles with an efficiency and simple folding mechanism.

SUMMARY

A principal intention of the present disclosure is to provide a roadable VTOL (Vertical Take-Off and Landing) flying vehicles, configured to take off and land like helicopters or gyrocopters with a single main rotor and a simple folding mechanism or by using twin rotors with clockwise (CW) and counter-clockwise (CCW) in tandem configuration having improved efficiency and a simple folding mechanism. The improved efficiencies are achieved by substantially increasing the rotor surface area with respect to the state of prior art designs of flying vehicles (up to more than 8 times and even more) without oversizing the vehicle dimensions. This is achieved by using a balanced single rotor with two balanced blades (see FIG. 1a), or a balanced twin-rotors helicopter scheme having 2 rotors respectively positioned at the leading and trailing ends of the vehicle (as shown in FIG. 1c).

The single rotor and the rotary wings of the twin rotor provide lifting power of the vehicle, and can be propelled to deliver forward thrust when the vehicle is airborne for forward flight and backward thrust when the vehicle is airborne for backward flight.

The calculation of the lifting power of the vehicle that is generated by a single rotor and the twin rotors that is directly proportional to the surface area (S) covered by the rotating rotor(s), are as follows:

The surface area covered by a single rotor, as shown in FIG. 1a, is calculated as follows:

$$S = \pi * \left(\frac{vehicle\_length}{2}\right)^2$$

The surface area covered by a twin rotors system, as shown in FIGS. 1c, 1d and 1e, is calculated as follows:

$$S = 2\pi \ast \text{vehicle\_length}^2$$

According to the present disclosure, both the propulsion generation mechanism and the rotor folding mechanism are implemented using the same motors that spin the rotors during takeoff and flight, are also used to park and lock them during road-configuration operation.

This combination is simple, durable, effective, and inexpensive, wherein the complicated folding mechanism, as provided by prior art systems, is replaced by an electronic position control subsystem configured to park the and lock the rotor(s), while in a road-configuration (as shown on FIGS. 1a, 1b and 1c), and simply convert the vehicle to flying mode by unlocking the blades, speeding up the motor and take off (as shown, for example in FIG. 1d). It should be appreciated that there is an additional mechanism (not shown) used to secure and cover the rotor(s) during road-configuration operation.

The flight control and steering, while in air-born mode, is achieved by using any method or technique, known in the art, for controlling the air-born vehicle, using either variable or fixed pitch rotors. The flight control methods may include, without limitations, the following methods: (1) using swashplate for variable pitch rotors; (2) using rotor tilt control for fixed pitch rotors by implementing any known on the art technique of rotors tilting, including, without limitations, bi-copter scheme, wherein the rotors can be tilted separately or both; and (3) by adding additional maneuvering motors and/or any controllable aerodynamical surfaces.

In variations of the present disclosure, a single-blade rotor, such as shown in FIG. 2a, is used, or multiple-blades rotors with automatic folding capability are used, such as shown in FIGS. 2b and 2c are used, all of which rotors may embed any known in the art passive or active folding mechanism.

In variations of the present disclosure, one or both of twin tandem rotors are coaxial rotors with pair of matching counterrotating rotors such as shown in FIG. 4a, are used.

In variations of the present disclosure, there is an additional rotor that provides the vehicle with an additional forward thrust, such as the two-blades rotors shown in FIG. 4b.

Optionally, the propulsion system may be using a hybrid (fuel and electric) engine, wherein the fuel engine is used as an electrical generator to supply the system power, wherein said fuel engine may be fully separated or be used to drive the car wheels during road-configuration operation by using any know in art hybrid engine scheme as shown in FIG. 5d.

It should be noted that in variations of the present disclosure the main propulsion system uses fuel engine, while the electrical motor is used to: (1) unfold and park the rotors; (2) start fuel engine and (3) be used as secondary backup system to continue the flight if the fuel engine fails as shown in FIG. 5c.

It should be noted that in variant of the present innovation the rotors driven independently using separate propulsion system each like shown in FIG. 5a.

It should be noted that in variant of the present innovation the rotors driven synchronously with common propulsion system like shown in FIGS. 5b and 5c.

According to teachings of the present disclosure, there is provided a roadable VTOL flying vehicle having a road-configuration and a flight-configuration. The roadable VTOL flying vehicle includes:
a roadable vehicle;
at least one rotor having at least one blade, the rotor is rotatably attached to an upper section of the roadable vehicle of the flying vehicle;
at least one motor configured to operatively rotate the least at least one rotor;
at least one angular position sensor configured to detect the angular position of each of the at least one rotor; and
a vehicle control sub-system configured to affect automatic transformation of the flying vehicle from the road-configuration to the flight-configuration and from the flight-configuration to the road-configuration,
wherein the vehicle control sub-system is configured bring the at least one rotor into a parking state, when in road-configuration.

Optionally, when the at least one rotor is in the parking state, the control sub-system is configured to position the respective at least one blade within the vertical space situated above the roadable vehicle of the flying vehicle. Typically, when the at least one rotor is in the parking state position, the at least one rotor is locked in position.

Optionally, the at least one blade is foldable, wherein when in a flight-configuration the blade is unfolded, and when in road-configuration the blade is folded. Optionally, the blade may unfold automatically by a centrifugal force, when changing from road-configuration to flight-configuration. Optionally, the blade may be folded automatically by a biassing force when changing from flight-configuration to road-configuration, wherein the biassing force may be formed by at least one spring.

The vehicle control sub-system may be configured to fold the at least one foldable blade when changing from flight-configuration to road-configuration.

The vehicle control sub-system may be configured unfold the at least one foldable blade when changing from road-configuration to flight-configuration.

The control sub-system may determine that the at least one rotor is in the parking state position using the at least one angular position sensor.

The at least one rotor may be a single-blade rotor, wherein the single-blade is balanced by a counter-weight.

Optionally, when the at least one rotor is a two-rotors system, the pair of rotors may be positioned in a tandem configuration, and wherein each rotor consists of a single blade balanced by a respective counter-weight,
wherein the pair of rotors may be matching and counter-rotating rotors;
wherein each of the rotors may include a single blade balanced by a respective counter-weight;
wherein each of the rotors may include at least two blades;
wherein each of the rotors may include a pair of coaxial rotors, and wherein each of the coaxial rotors includes each pair coaxial rotors a pair of matching and counterrotating rotors;
wherein each of the pair of rotors may be coupled by a respective motor configured to operatively rotate the respective rotor, wherein each of the motors is coupled by a respective angular position sensor, and wherein the pair of rotors are either synchronous or asynchronous; and
wherein the pair of rotors may be coupled by a single rotating-motor configured to operatively rotate both rotors, wherein the rotating-motor is coupled by an angular position sensor, wherein the pair of rotors are synchronous and wherein the rotating-motor may also be coupled by another supporting motor selected from a group of power source including a fuel motor, another electric power source, and/or a hybrid power source.

The pair of rotors may be matching and counterrotating rotors;

wherein each of the rotors may include a single blade balanced by a respective counter-weight, wherein each of the pair of rotors may be coupled by a respective motor configured to operatively rotate the respective rotor, wherein each of the motors is coupled by a respective angular position sensor, and wherein the pair of rotors are either synchronous or asynchronous;

When at least one rotor is a two-rotors system and the pair of rotors may be positioned in a tandem configuration, wherein each rotor consists of a single blade balanced by a respective counter-weight, the pair of rotors may be coupled by a single rotating-motor configured to operatively rotate both rotors, wherein the rotating-motor is coupled by an angular position sensor, and wherein the pair of rotors are synchronous, the rotating-motor may also be coupled by another supporting motor selected from a group of power source including a fuel motor, another electric power source, and/or a hybrid power source.

When at least one rotor is a two-rotors system and the pair of rotors may be positioned in a tandem configuration, wherein each rotor consists of a single blade balanced by a respective counter-weight, the pair of rotors may be coupled by a single rotating-motor configured to operatively rotate both rotors, wherein the rotating-motor is coupled by an angular position sensor, and wherein the pair of rotors are synchronous, the pair of rotating-motors may be driven by a controlled power source, and wherein the controlled power source include:

- a power control unit configured to monitor and coordinate the electric power within the roadable VTOL flying vehicle;
- a rechargeable battery;
- a power electric motor configured to supply electric power to the roadable VTOL flying vehicle; and,
- and an additional power source configured to drive the power electric motor,
- wherein when in road-configuration, the additional power source is configured to drive the wheels of the roadable vehicle; and
- wherein when in flight-configuration, the power control unit is configured to direct electric power from the power electric motor to the rotating-motors that are configured to respectively operate the rotors;
- wherein optionally, the additional power source is configured to activate the power electric motor to thereby recharge the rechargeable battery;
- wherein optionally, when the additional power source is silent, the power control unit directs rechargeable battery to providing electric power;
- wherein optionally, when in flight-configuration, the additional power source is configured to activate the power electric motor to thereby recharge the rechargeable battery;
- wherein optionally, when in flight-configuration, the additional power source is configured generate mechanical energy to drive the power electric motor; and
- wherein optionally, the additional power source, the power electric motor and the rechargeable battery are configured to operate in a hybrid configuration.

Optionally, when at least one rotor is a two-rotors system and the pair of rotors may be positioned in a tandem configuration, wherein each rotor consists of a single blade balanced by a respective counter-weight, the pair of rotors may be coupled by a single rotating-motor configured to operatively rotate both rotors, wherein the rotating-motor is coupled by an angular position sensor, wherein the pair of rotors are synchronous, the rotating-motor may also be coupled by another supporting motor selected from a group of power source including a fuel motor, another electric power source, and/or a hybrid power source, and wherein the pair of rotors are configured to operate as intermeshing rotors. Optionally, the roadable VTOL flying vehicle further including a parachute configured to accommodate an emergency parachute.

BRIEF DESCRIPTION OF THE DRAWINGS

The present invention will become fully understood from the detailed description given herein below and the accompanying drawings, which are given by way of illustration and example only and thus not limitative of the present disclosure, and wherein:

FIG. 3a is a side view schematic illustration of another example roadable VTOL flying vehicle, according to aspects of the present disclosure, wherein the roadable VTOL flying vehicle includes a pair of tandem, counter-rotating rotors, each having a pair of foldable blades, and wherein each blade is near or equal to the length of the roadable vehicle. The example roadable VTOL flying vehicle, FIG. 3b illustrates the roadable VTOL flying vehicle, as shown in FIG. 3a, wherein the rotors are shown in a rotating state (flight-configuration), and wherein the surface area covered by each rotor is illustrated.

FIG. 3c is a top view illustration of the roadable VTOL flying vehicle shown in FIG. 3a, wherein the rotors are shown in a folded state (road-configuration), and wherein the surface area covered by each rotor is illustrated.

FIG. 3d is a top view illustration of the roadable VTOL flying vehicle shown in FIG. 3a, wherein the rotors are shown in an unfolded state (flight-configuration), and wherein the surface area covered by each rotor is illustrated.

FIG. 4a is a side view illustration of another example roadable VTOL flying vehicle, according to aspects of the present disclosure, wherein both of twin tandem rotors are coaxial rotors.

FIG. 4b illustrates the roadable VTOL flying vehicle, as shown in FIG. 4a, wherein the roadable VTOL flying vehicle further includes an additional multiple-blades rotor that provides the vehicle with an additional forward thrust.

FIG. 5b is a schematic illustration of an example synchronous twin-rotors propulsion system, according to aspects of the present disclosure, wherein both rotors are operated by a single motor that is coupled with an angular position sensor.

DETAILED DESCRIPTION

The present disclosure will now be described more fully hereinafter with reference to the accompanying drawings, in which preferred embodiments of the disclosure are shown. This disclosure may, however, be embodied in many different forms and should not be construed as limited to the embodiments set forth herein; rather, these embodiments are provided, so that this disclosure will be thorough and complete, and will fully convey the scope of the invention to those skilled in the art.

An embodiment is an example or implementation of the disclosures. The various appearances of "one embodiment," "an embodiment" or "some embodiments" do not necessarily all refer to the same embodiment. Although various features of the disclosure may be described in the context of a single embodiment, the features may also be provided separately or in any suitable combination. Conversely, although the disclosure may be described herein in the context of separate embodiments for clarity, the disclosure may also be implemented in a single embodiment.

Reference in the specification to "one embodiment", "an embodiment", "some embodiments" or "other embodiments" means that a particular feature, structure, or characteristic described in connection with the embodiments is included in at least one embodiment, but not necessarily all embodiments, of the disclosures. It is understood that the phraseology and terminology employed herein are not to be construed as limiting and are for descriptive purpose only.

Meanings of technical and scientific terms used herein are to be commonly understood as to which the disclosure belongs, unless otherwise defined. The present disclosure can be implemented in the testing or practice with methods and materials equivalent or similar to those described herein.

It should be noted that orientation related descriptions such as "bottom", "up", "upper", "down", "lower", "top" and the like, assumes that the associated item, such as the flying car or a portion thereof, is in a road-configuration.

Figure 1A:
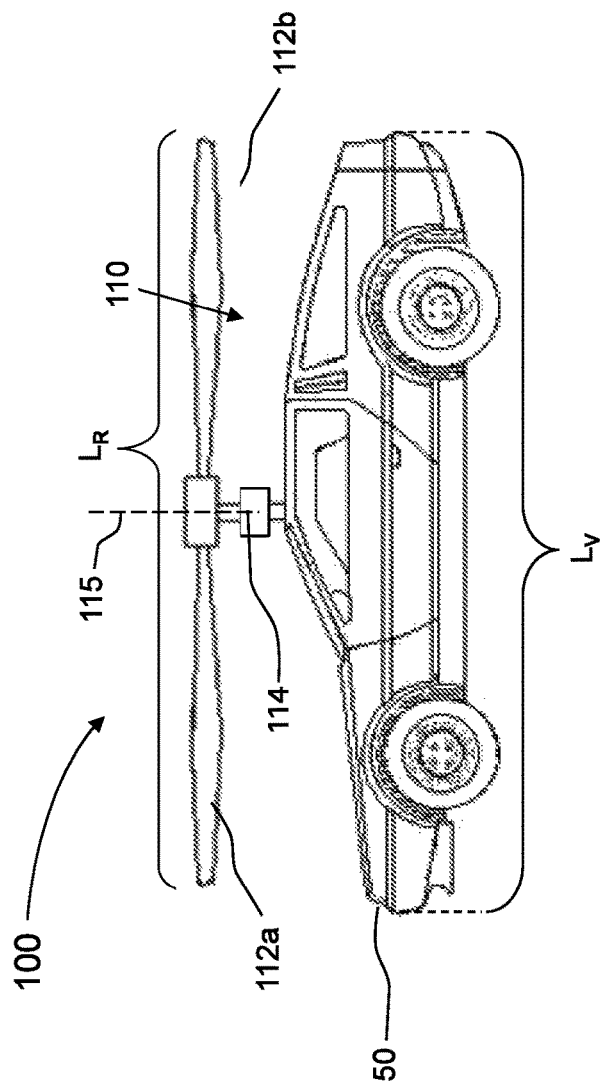
FIG. 1a is a side view illustration of an example roadable VTOL flying vehicle, according to aspects of the present disclosure, the flying vehicle including a single two-blades rotor being in a parked state.

Reference is made back to the drawings. FIG. 1a is a schematic side view illustration of an example roadable VTOL flying vehicle 100, according to aspects of the present disclosure, the flying vehicle 100 includes a single two-blades (112a, 112b) rotor 110 being in either a parked state or a flying-configuration. One or both blades (112a, 112b) may be foldable blades. The rotor 110 is configured to rotate by a motor 114, wherein rotor 110 rotates about the axis of an axle 115 that is affixed to the upper section of the roadable vehicle 50 of flying vehicle 100. It should be appreciated that the roadable vehicle 50 can be based on any common roadable vehicle, pending on its weight.

Roadable VTOL flying vehicle 100 has a length $L_V$, wherein, preferably, the wingspan $L_R$ of the two-blades (112a, 112b) of rotor 110 does not exceed length $L_V$ of the roadable vehicle 50 of flying vehicle 100. Hence, flying vehicle 100 may behave on the road, while in a roadable-configuration, like any other ordinary vehicle.

Figure 1B:
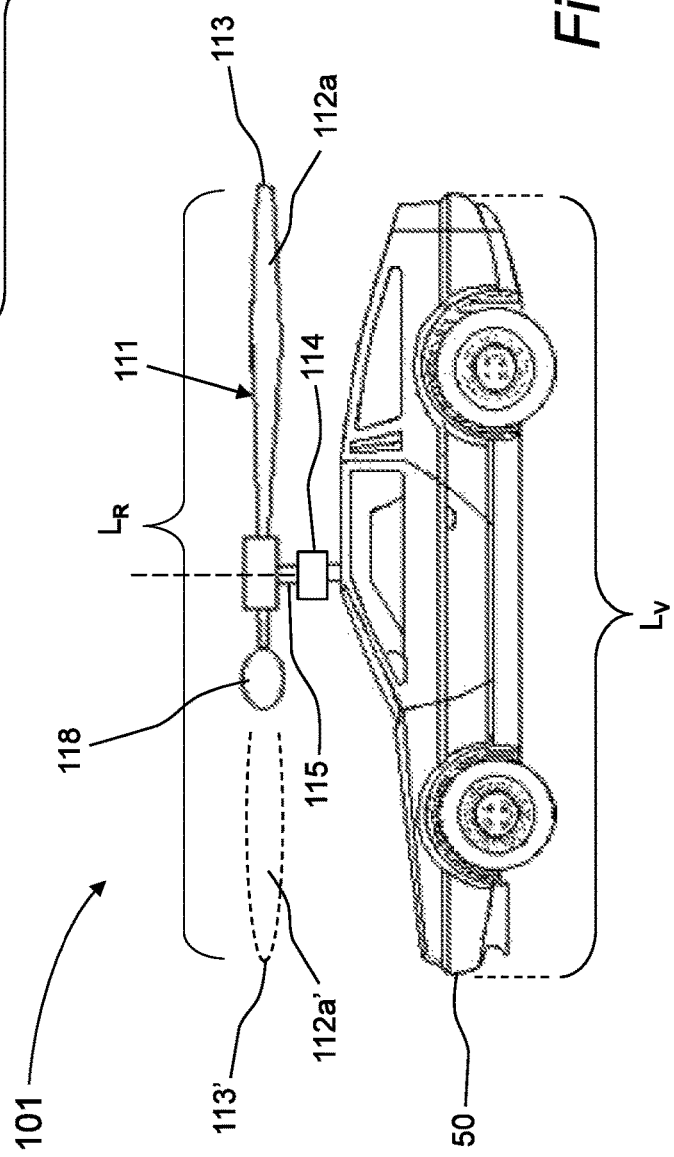
FIG. 1b is a side view illustration of another example roadable VTOL flying vehicle, according to aspects of the present disclosure, the flying vehicle including a single mono-blade rotor being in a parked state.

FIG. 1b is a schematic side view illustration of another example roadable VTOL flying vehicle 101, according to aspects of the present disclosure, the flying vehicle 100 includes a single-blade 112a rotor 111 that is balanced by a counter-weight 118, wherein rotor 111 is in either a parked state or a flight-configuration rotational state. Blade 112a may be a foldable blade. The rotor 111 is configured to rotate by a motor 114, wherein rotor 111 rotates about the axis of an axle 115 that is affixed to the upper section of the roadable vehicle 50 of flying vehicle 100.

Roadable VTOL flying vehicle 101 has a length $L_V$, wherein, preferably, the diameter (between positions 113 and 113') of the imaginary circle drawn by the tip 113 of blade 112a of rotor 111 does not longer than the length $L_V$ of the roadable vehicle 50 of flying vehicle 101. Hence, flying vehicle 101 may behave on the road, while in a road-configuration, like any other ordinary vehicle.

Figure 1C:
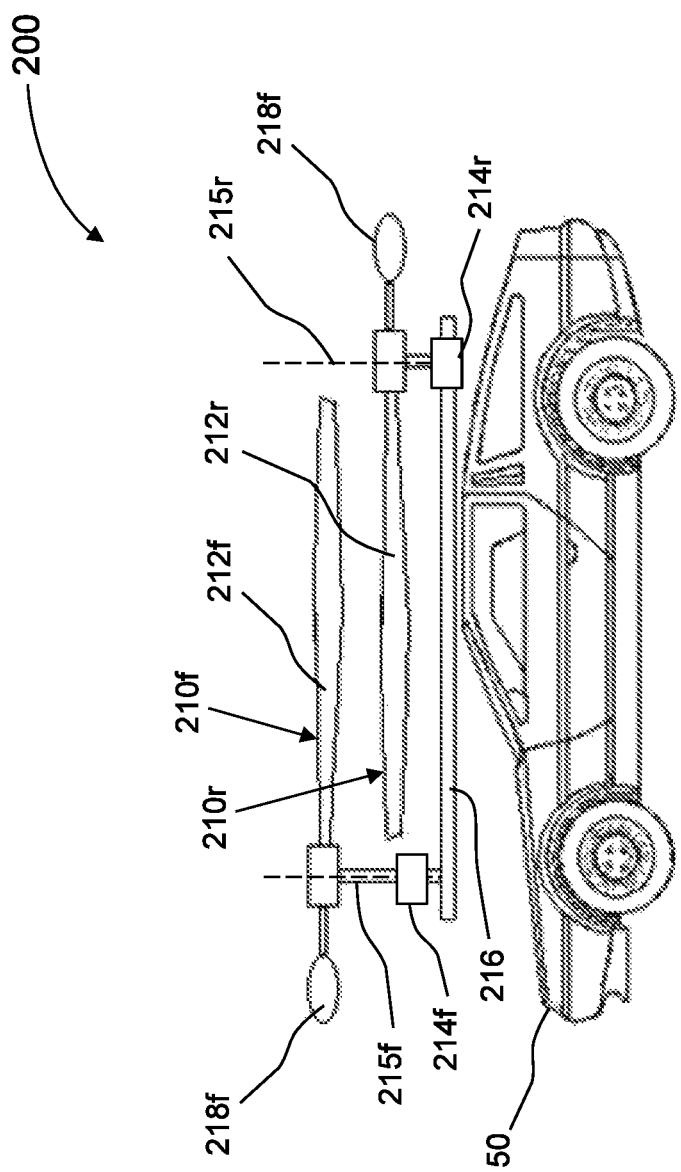
FIG. 1c is a side view illustration of another example roadable VTOL flying vehicle, according to aspects of the present disclosure, wherein the flying vehicle including two rotors are in a tandem configuration, wherein each rotor consists of a single blade, and the rotors are shown in a parked state.

FIG. 1c is a schematic side view illustration of another example roadable VTOL flying vehicle 200, according to aspects of the present disclosure, wherein flying vehicle 200 includes two rotors (210f, 210r) positioned in a tandem configuration, wherein each rotor (210f, 210r) consists of a single blade (212f, 212r), and wherein the rotors (210f, 210r) are shown in a parked state. A front motor 214f is configured to activate the front rotor 210f, and a rear motor 214r is configured to activate the rear rotor 210r. It should be noted that the pair of rotors (310f, 310r) are matching and counterrotating rotors. The front rotor 210f is configured to rotate about the axis of a front axle 215f that is affixed to the front section of a static bench 216, and the rear rotor 210r is configured to rotate about the axis of a rear axle 215r that is affixed to the rear section of static bench 216. Bench 216 is affixed to the upper section of the roadable vehicle 50 of flying vehicle 100. Each blade (212f, 212r) is typically balanced by a respective counter-weight (218f, 218r).

It should be appreciated that for a common roadable vehicle 50 having a length $L_V \approx 4$ meters, the length of a blade is about 2 meters see FIG. 1a), and thus the surface area (S) covered by the rotating rotor 110 is:

$$S = \pi * (vehicle_{length}/2)^2 = \pi * 4 \approx 12.5 m^2.$$

It should be further appreciated that a surface area (S) of 100 m² that is covered by the twin rotating rotors (see, for example blades 310, FIGS. 3a and 4B) is:

$$S_{TWIN}=2*(\pi*vehicle\_length^2)=2*(\pi*16)\approx100m^2,$$

and thereby provide enough lifting power for an efficient helicopter/gyrocopter flight.

It should be further appreciated that for a common roadable vehicle 50 having a length the wingspan $L_R$ can be further expanded by parking rotating rotor 110 at the diagonal dimension $L_D$ of roadable vehicle 50. If the width of the vehicle is 1.8 meters, then $$L_D=\sqrt{(4^2+1.8^2)}\approx4.9m, \text{ and thereby}$$

$$S_{DIAG}=2\pi*19.24\approx120m^2.$$

Figure 1D:
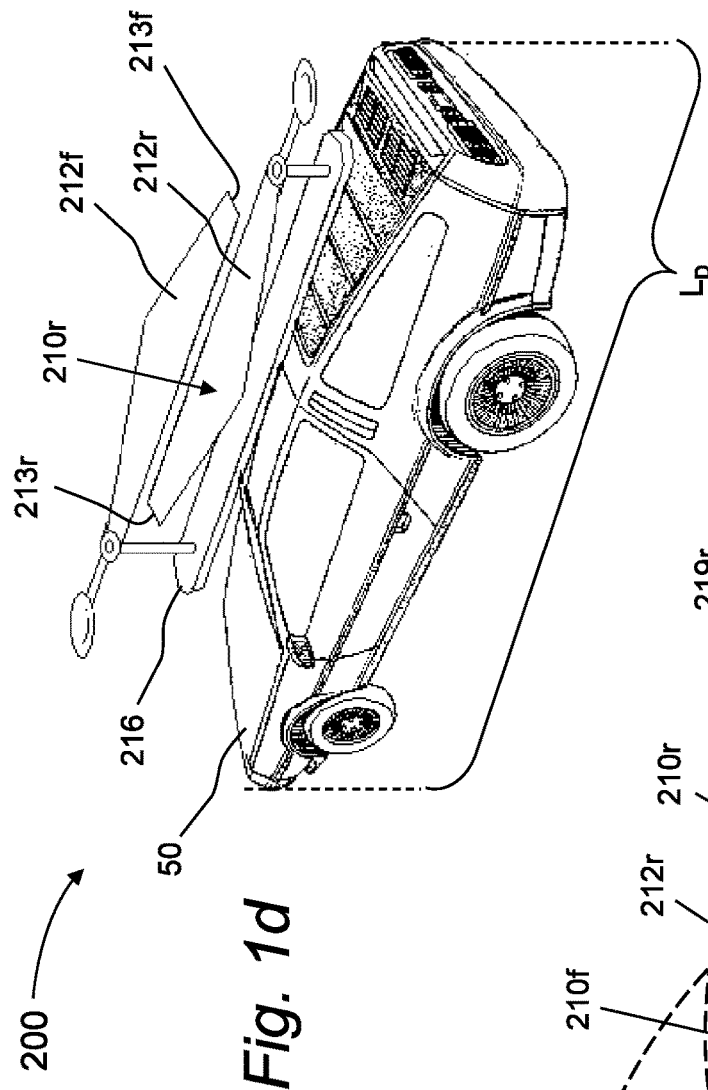
FIG. 1d is an elevated rear perspective view illustration of the roadable VTOL flying vehicle as shown in FIG. 1c.
Figure 1E:
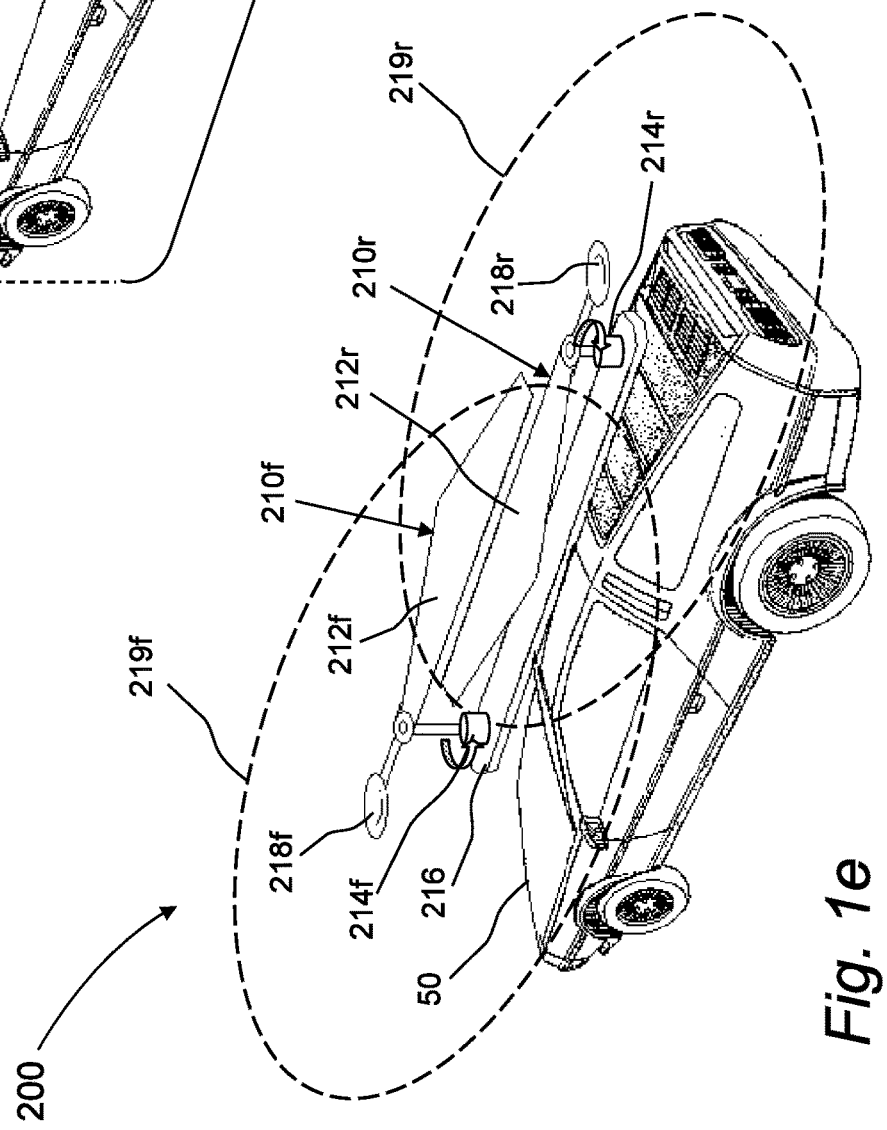
FIG. 1e illustrates the roadable VTOL flying vehicle, as shown in FIG. 1d, wherein the rotors are shown in a rotating state, and wherein the surface area covered by each rotor is illustrated.

FIG. 1d is an elevated rear perspective schematic view illustration of roadable VTOL flying vehicle 200 as shown in FIG. 1c. FIG. 1e illustrates roadable VTOL flying vehicle 200, as shown in FIG. 1d, wherein the rotors (210f, 210r) are shown in a rotational state, and wherein the surface area covered by each rotor (210f, 210r) is illustrated by a respective peripheral imaginary boundary outlines 219f, 219r (each peripheral imaginary boundary outlines 219 is a circle drawn by the tip of a respective blade (212f, 212r), similar to the imaginary circle drawn by the tip 113 of blade 112a of rotor 111). As can be seen in FIG. 1d, the total surface area (219f, 219r) covered by the twin-rotors (210f, 210r) is substantially (about X8 times) larger than that covered by single rotor 110.

It should be appreciated that the flight control and steering, while in air-born mode, is achieved by using any method or technique, known in the art, for controlling the air-born vehicle, using either variable or fixed pitch rotors. The flight control methods may include, without limitations, the following methods: (1) using swashplate for variable pitch rotors; (2) using rotor tilt control for fixed pitch rotors by implementing any known on the art technique of rotors tilting, including, without limitations, bi-copter scheme, wherein the rotors can be tilted separately or both; and (3) by adding additional maneuvering motors and/or any controllable aerodynamical surfaces.

Figure 2A:
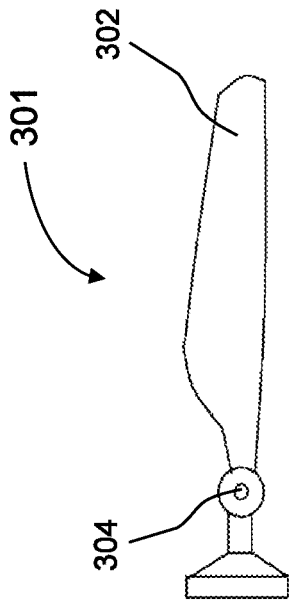
FIG. 2a illustrates an example single blade rotor, according to aspects of the present disclosure.
Figure 2B:
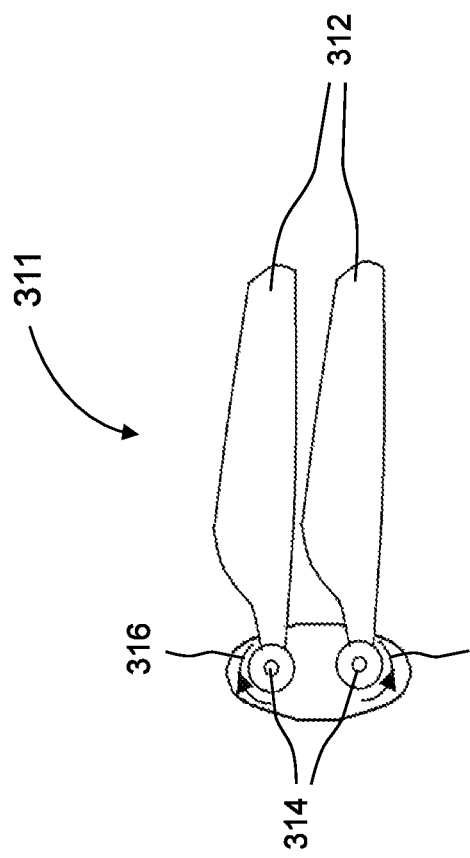
FIG. 2b illustrates an example two blades rotor, according to aspects of the present disclosure, wherein the blades are shown in parking position.
Figure 2C:
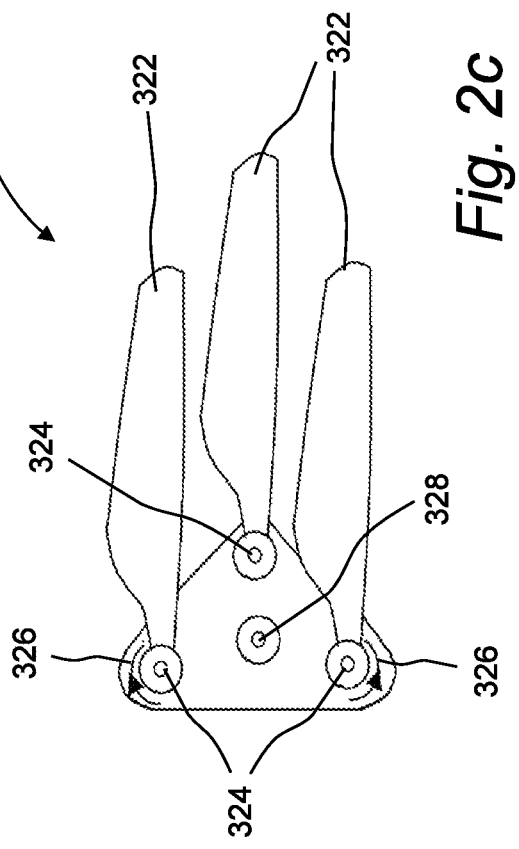
FIG. 2c illustrates an example three blades rotor, according to aspects of the present disclosure, wherein the blades are shown in parking position.

In variations of the present disclosure, single-blade rotors 301, such as schematically shown by way of example in FIG. 2a, is used (for example, rotate about axis 304), or multiple-blades rotors (311,321) with automatic folding capability (for example, rotate about axis 315 or 324, respectively) are used in direction 316, 326, respectively, such as schematically shown by way of example in FIGS. 2b and 2c are used, all of which rotors (301,311,321) may embed any known in the art passive or active folding mechanism. In variations of the present disclosure, such as schematically shown by way of example in FIG. 2c, the whole rotor assembly may move or rotate about axis 328.

FIG. 3a is a side view schematic illustration of another example roadable VTOL flying vehicle 300, according to aspects of the present disclosure, wherein roadable VTOL flying vehicle 300 includes a pair of tandem, counter-rotating rotors (front rotor 310f, and rear rotor 310r), wherein both of twin tandem rotors are two-blades (312a, 312b) rotors, and wherein each blade is near or equal to the length $L_V$ of the roadable vehicle 50. The example roadable VTOL flying vehicle 300, is shown in a flight-configuration, in which configuration all folding blades (312fa, 312fb, 312ra, 312rb) are shown unfolded. It should be noted that the pair of rotors (310f, 310r) are matching and counterrotating rotors. It should be noted that blades 312a, 312b of rotors (310f, 310r), are foldable blades, wherein in this none limiting example, foldable blades 312a, 312b are configured as in shown by configuration 311 of FIG. 2a.

FIG. 3b illustrates roadable VTOL flying vehicle 300, as shown in FIG. 3a, wherein the rotors (310f, 310r) are shown in a rotational state, and wherein the surface area covered by each rotor (310f, 310r) is illustrated by a respective peripheral imaginary boundary outlines 319f, 319r (each peripheral imaginary boundary outlines 319 is a circle drawn by the tip of the respective blade (312f, 312r), similar to the imaginary circle drawn by the tip 113 of blade 112a of single rotor 111 shown in FIG. 1b.

FIG. 3c is a top view illustration of roadable VTOL flying vehicle 300, wherein the rotors (310f, 310r) are shown in a folded state (road-configuration), and wherein the rotors (310f, 310r) remain within the external boundary of roadable vehicle 50.

FIG. 3d is a top view illustration of roadable VTOL flying vehicle shown in FIG. 3c, wherein the rotors (310f, 310r) are shown in an unfolded state (flight-configuration), and wherein the surface area covered by each rotor (310f, 310r) is illustrated.

It should be appreciated that roadable VTOL flying vehicle 300, may include a vehicle control sub-system 390 configured to affect folding of one or both foldable blades 312fa, 312fb, 312ra, 312rb of each rotor (310f, 310r), when changing from flight-configuration to road-configuration. Similarly, control sub-system 390 is configured to unfold one or both foldable blades 312fa, 312fb, 312ra, 312rb of each rotor (310f, 310r), when changing from road-configuration to flight-configuration.

It should be further appreciated that one or both foldable blades 312fa, 312fb, 312ra, 312rb of each rotor (310f, 310r) may fold automatically by a predesigned biassing force when changing from flight-configuration to road-configuration. The biassing may be formed by at least one spring and/or at least one piston and/or any other form of biassing force known in the art. Similarly, control sub-system 390 is configured to unfold one or both foldable blades 312fa, 312fb, 312ra, 312rb of each rotor (310f, 310r), when changing from road-configuration to flight-configuration. Similarly, may unfold automatically by a predesigned centrifugal force, when changing from road-configuration to flight-configuration.

It should be further appreciated that one or both foldable blades 312fa, 312fb, 312ra, 312rb of each rotor (310f, 310r) may fold/unfold automatically by any other mechanism known in the art. FIG. 4a is a side view schematic illustration of another example roadable VTOL flying vehicle 202, according to aspects of the present disclosure. Roadable VTOL flying vehicle 202 is similar to the tandem configuration of roadable VTOL flying vehicle 200, wherein on each axle (215f, 215r) two coaxial rotors are mounted: front upper rotor 210fu, activated by front upper motor 214f, and front lower rotor 210fd, activated by front lower motor 214f. Similarly, rear upper rotor 210ru, activated by rear upper motor 214r, and rear lower rotor 210rd, activated by rear lower motor 214r. It should be noted that each pair coaxial rotors (upper rotor 210u, lower rotor 210d), includes a pair of matching and counterrotating rotors ((210fu, 210fd) and (210ru, 210rd)).

It should be appreciated that roadable VTOL flying vehicle 300, may include a vehicle control sub-system 290 configured similar to vehicle control sub-system 390.

FIG. 4b is a side view schematic illustration of another example roadable VTOL flying vehicle 302, according to aspects of the present disclosure, wherein roadable VTOL flying vehicle 302 is equivalent to roadable VTOL flying vehicle 300, and further includes an additional multiple-blades rotor 160 that provides the vehicle with an additional forward thrust. It should be appreciated that any roadable VTOL flying vehicle (100,101,200,202,300,400,500,600, 700,800,900) may include an additional rotor 160 that provides the vehicle with an additional forward thrust.

Figure 5A:
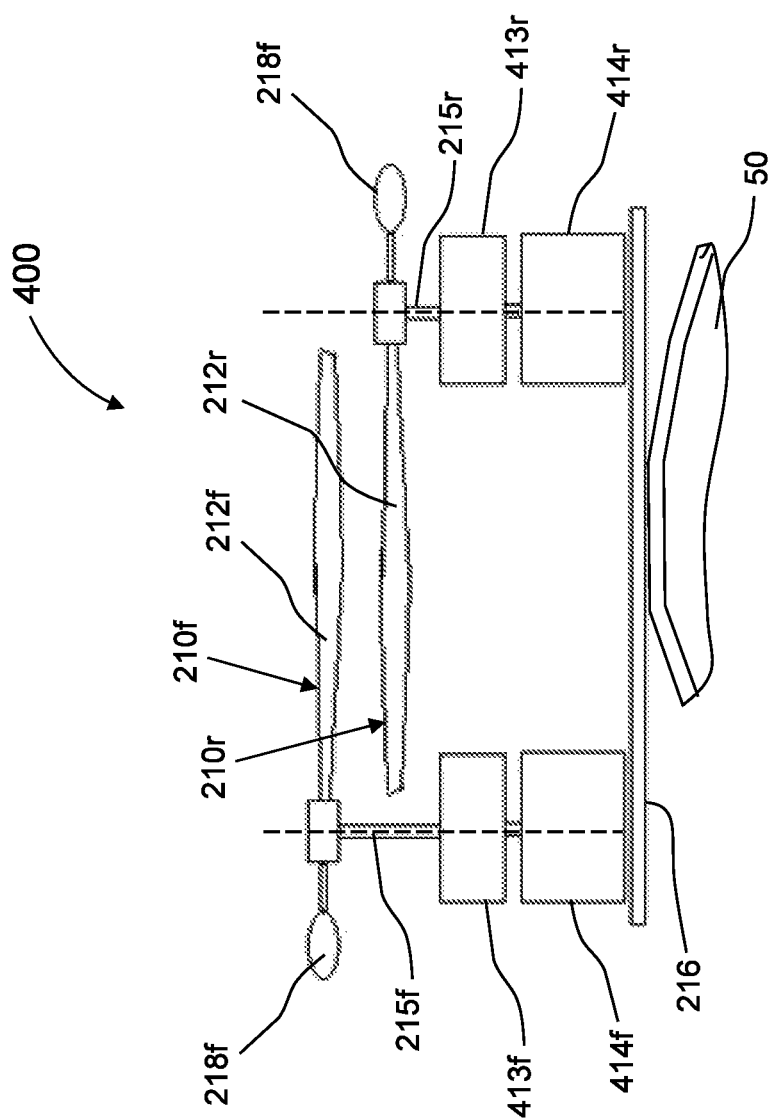
FIG. 5a is a schematic illustration of an example asynchronous tandem twin-rotors, according to aspects of the present disclosure, wherein each of the twin rotors is driven by a single motor that is coupled with an angular position sensor.

FIG. 5a is a schematic illustration of an example asynchronous tandem twin-rotors (210f, 210r) of a computerized propulsion system 400, according to aspects of the present disclosure, wherein each of the twin-rotors (210f, 210r) includes a respective motor (414f, 414r) coupled with an angular position sensor (413f, 413r). Hence, each rotor 210 is driven independently by the respective motor (414f, 414r). A processing unit of the computerized propulsion system 400 is configured to compute the angular position of each respective blade (212f, 212r). Thereby, when in road-configuration, the processing unit of the computerized propulsion system 400 is configured to park each respective blade (212f, 212r) such that the respective blade (212f, 212r) is positioned within the vertical space situated above the roadable vehicle 50 of flying vehicle 100.

It should be appreciated that each motor (414f, 414r) can be powered by an electric power source (battery or fuel-cell), gasoline or any other fuel, or any other power source known in the art, and/or a hybrid power source combination.

FIG. 5b is a schematic illustration of an example synchronous twin-rotors (210f, 210r) propulsion system 500, according to aspects of the present disclosure, wherein both rotors (210f, 210r) are operated by a single motor 514 that is coupled with an angular position sensor 513. The synchronous propulsion scheme shown in FIG. 3b utilizes a common axis 520 to transfer the propulsion energy from a motor 514 and split the energy between the two rotors (210f, 210r) using bevel gears (530f, 530r) or any other transmission mechanism known in the art, wherein the rotors (210f, 210r) rotate synchronously clock wise (CW) and counter clock wise (CCW), and wherein the relative angular offset of rotors (210f, 210r) is pre aligned to be able to simultaneously enter into a park position using of both blades (212f, 212r) using the single angular position sensor 513.

Figure 5C:
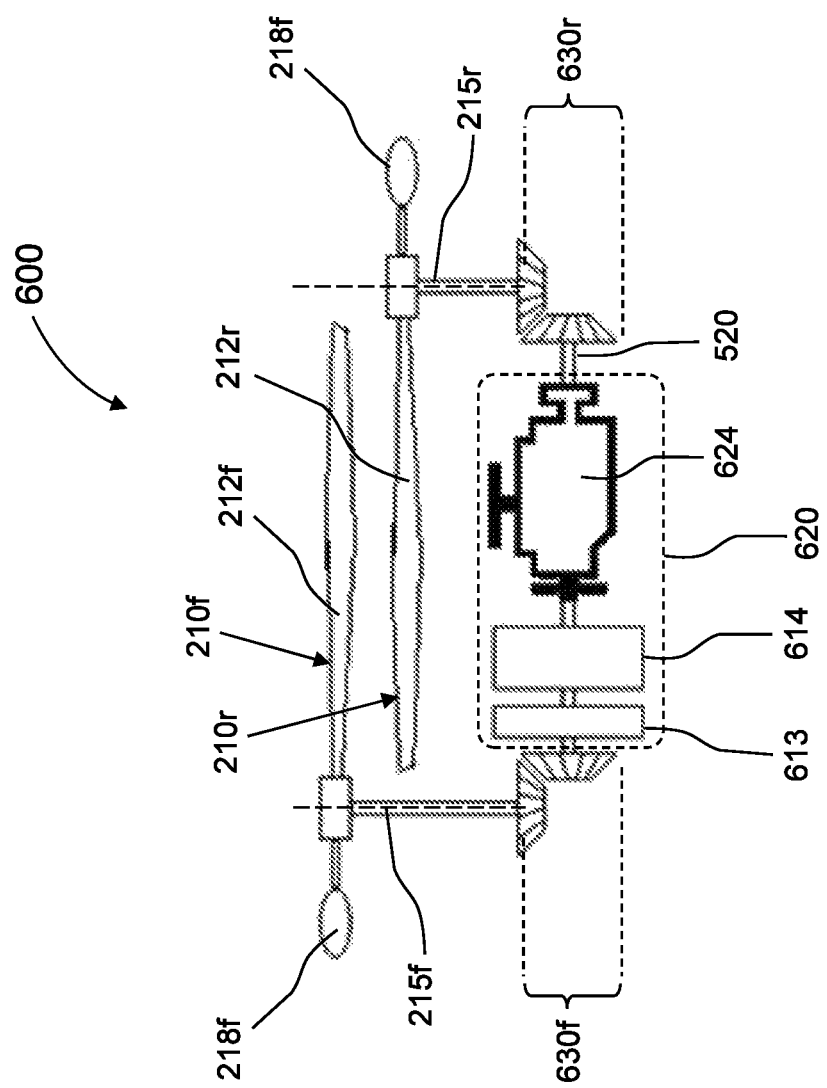
FIG. 5c is a schematic illustration of an example synchronous twin rotors propulsion system, wherein the twin rotors are operated by a hybrid motorized system, including a single electric motor that is coupled with an angular position sensor and a fuel motor.

FIG. 5c is a schematic illustration of an example synchronous twin rotors (210f, 210r) propulsion system 600, wherein the twin rotors (210f, 210r) are operated by a hybrid motorized system 620, including a single electric motor/generator 614 that is coupled with an angular position sensor 613 and a fuel motor 624.

The fuel engine 624 may be configured to provide the main propulsion thrust to facilitate flying of the flying vehicle, wherein the electric motor 614/generator along with angular position sensor 613 may be configured to enable rotor (210f, 210r) to unfold and park the blades (212f, 212r), when switching the flying vehicle from flight configuration to road-configuration. Electric motor/generator 614 may also be used as the fuel engine 624 starter; as secondary backup system to continue the flight should the fuel engine 624 fail; and as an alternator.

Figure 5D:
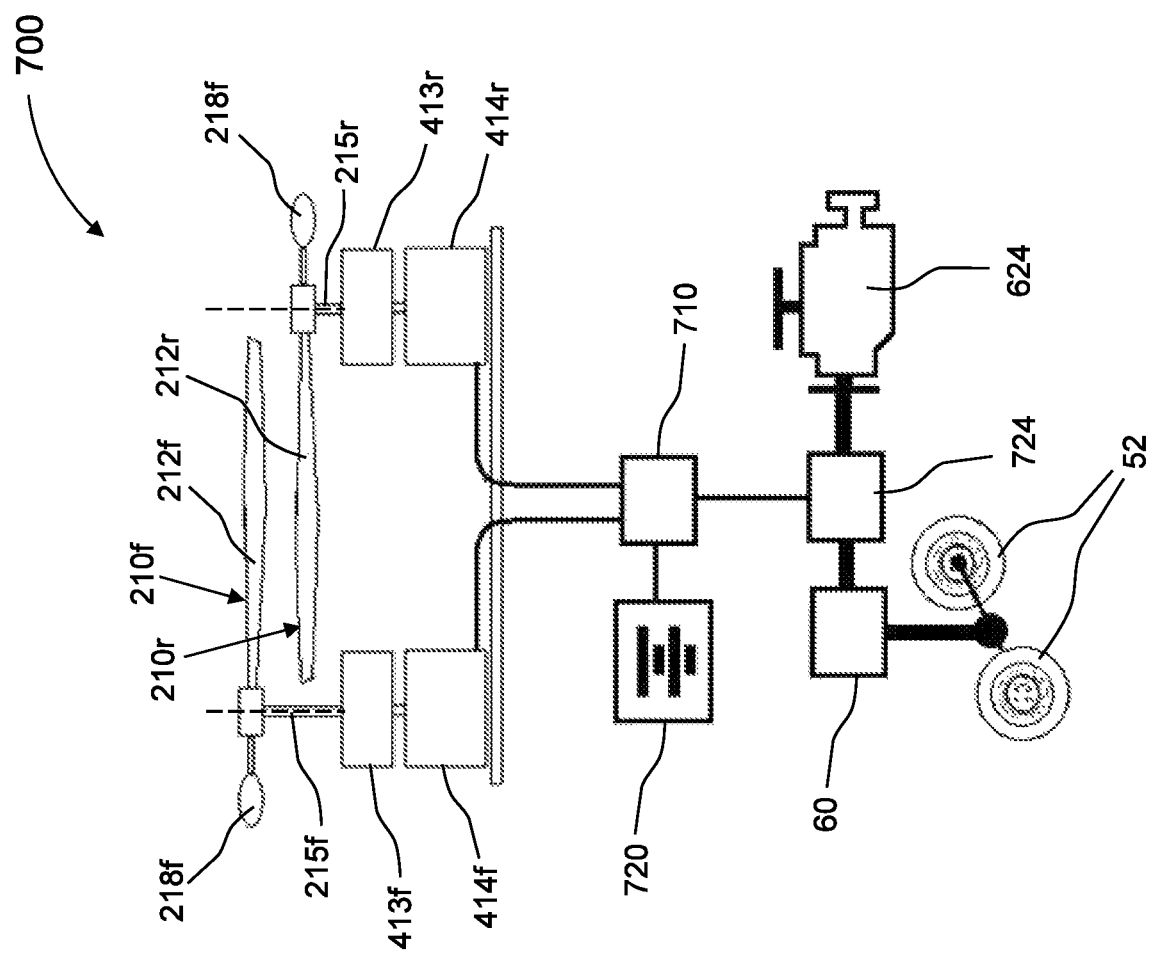
FIG. 5d is a schematic illustration of an example hybrid, synchronous or asynchronous twin rotors propulsion system, wherein, while in road-configuration operation, the hybrid motorized system is also used to drive the wheels of the vehicle.

FIG. 5d is a schematic illustration of an example hybrid, synchronous or asynchronous twin rotors (210f, 210r) propulsion system 700, wherein, while in road-configuration operation, the hybrid motorized system is also used to drive the wheels of the vehicle. The fuel/gasoline engine 624 may be used as an electric generator 724 for supplying electric power of the system. The fuel engine 624 may be fully separated and may also be used to drive the car wheels 52 during road-configuration operation, using any know in art hybrid engine scheme as shown, by way of example only, in FIG. 5d. Propulsion system 700 may further include an electric motor/generator 724 configured to supply electric power to system 700 along with fuel engine 624. The hybrid pair of electric motor 724 and fuel engine 624, may be used to drive the car wheels 52 during road-configuration operation, via gear unit 60. A power control unit 710 monitors and coordinates the electric power within system 700, including providing electric from a rechargeable battery 720, for example, when the fuel engine 624 is silent, and charging battery 720 when the fuel engine 624 is powered.

When in flying mode, fuel engine 624 may generate mechanical energy that is used drive electric motor 724 that in turn supplies electric power to power control unit 710. Power control unit 710 then provides electric power to the motor units (such as 414f, 414r) of the respective rotors (such as 210f, 210r). Power control unit 710 provides electric power to the angular position sensor (such as 413f, 413r) and/or to any other electric unit of propulsion system 700.

Figure 6:
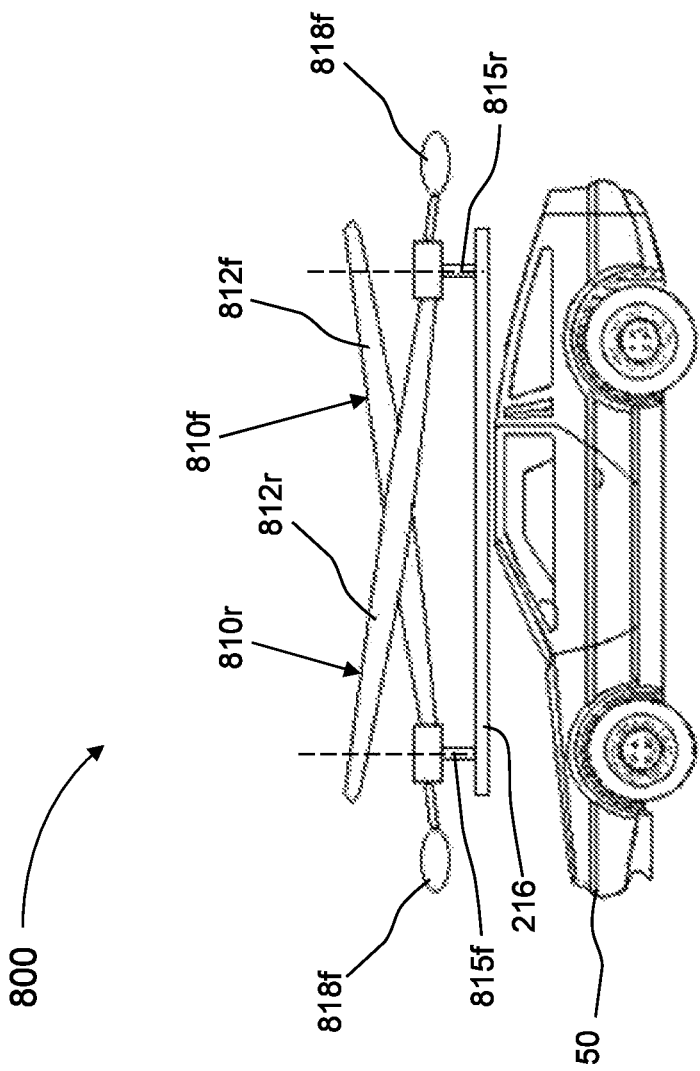
FIG. 6 illustrates the roadable VTOL flying vehicle, as shown in FIG. 1c, wherein the twin tandem rotors are configured to operate as intermeshing rotors.

Reference is now made to FIG. 6, schematically illustrating a roadable VTOL flying vehicle 800, wherein the twin tandem rotors (810f, 810r) are configured to operate as intermeshing rotors. The intermeshing tandem rotors (810f, 810r) are synchronized in order to avoid rotor collision.

Figure 7:
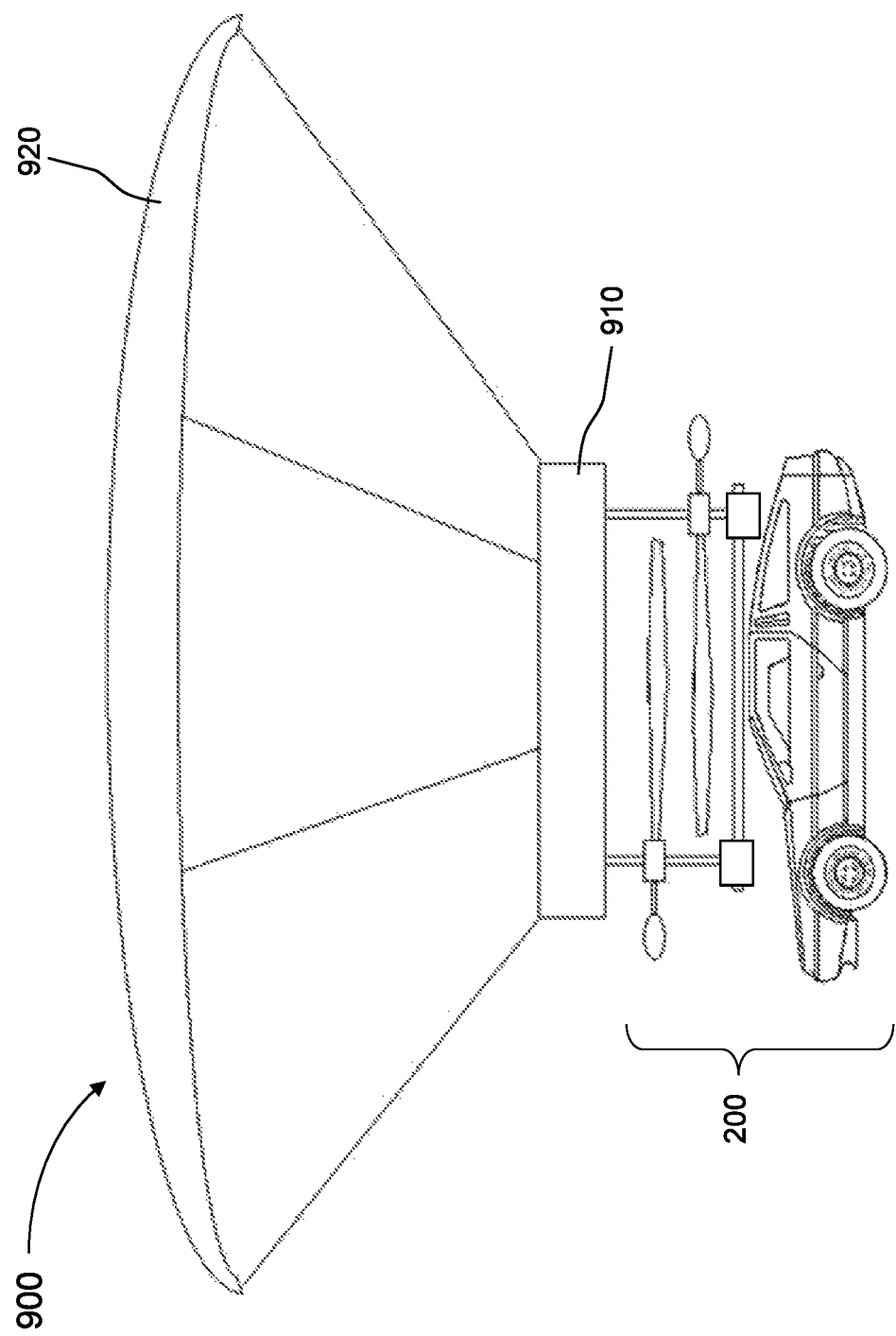
FIG. 7 illustrates an example two blades rotor, according to aspects of the present disclosure, wherein parachute container mounted above the twin tandem rotors system, such as shown by way of example only in FIG. 1c.

Reference is now made to FIG. 7 that schematically illustrates an example twin-rotors roadable VTOL flying vehicle 900, according to aspects of the present disclosure, wherein a parachute container 910 is mounted above the twin tandem rotors system 200, that is shown by way of example only. Parachute container 910 is configured to accommodate a parachute 920 that is designated to be used in emergency situations, while in flying configuration.

It should be appreciated that any roadable VTOL flying vehicle (100,101,200,202,300,400,500,600,700,800,900) may include a vehicle control sub-system configured similar to vehicle control sub-system 390.

The invention being thus described in terms of several embodiments and examples, it will be obvious that the same may be varied in many ways. Such variations are not to be regarded as a departure from the spirit and scope of the invention, and all such modifications as would be obvious to one skilled in the art.

What is claimed is:

1. A non-fixed wing roadable Vertical Take-Off and Landing (VTOL) flying vehicle having a road-configuration and a flight-configuration, comprising:
    a vehicle width, a front end and a rear end, and a vehicle length defined between the front end and the rear end;
    at least two rotors, each rotor having at least one blade and a wingspan length defined between the at least two rotors that does not exceed the vehicle length, wherein the at least two rotors are rotatably attached to an upper section of the non-fixed wing roadable VTOL flying vehicle;
    at least two rotating-motors, each of the at least two rotating-motors configured to operatively rotate one of the at least two rotors in the flight-configuration;
    at least one angular position sensor configured to detect an angular position of each of the at least two rotors;
    a power motor configured to operatively rotate wheels of the non-fixed wing roadable VTOL flying vehicle via a gear unit directly coupled to the wheels in the road-configuration; and
    a vehicle control sub-system configured to affect automatic transformation from the road-configuration to the flight-configuration and from the flight-configuration to the road-configuration, wherein the vehicle control sub-system is configured to bring the at least two rotors into a parking state, when in the road-configuration;

wherein when the at least two rotors are in the parking state, the vehicle control sub-system is configured to position each of the at least one blade within a vertical space situated above the non-fixed wing roadable VTOL flying vehicle, and within an area defined by the vehicle width and the vehicle length of the non-fixed wing roadable VTOL flying vehicle, wherein each of the at least two rotors includes a front rotor and a rear rotor positioned in a tandem configuration; and wherein each of the at least one blade, in the flight-configuration, are operatively positioned in an overlapping configuration, controlled by the at least one angular position sensor.

2. The vehicle of claim 1, wherein when the at least two rotors are in the parking state, the at least two rotors are locked in position, wherein a length of each of the at least one blade is approximately 2 meters.

3. The vehicle of claim 1, wherein the at least one blade is balanced by a respective counterweight being one of a second blade or a pair of blades, each being substantially identical to the at least one blade.

4. The vehicle of claim 3, wherein when in the flight-configuration each of the at least one blade and the second blade or the pair of blades are unfolded, and when in the road-configuration each of the at least one blade and the second blade or the pair of blades are folded.

5. The vehicle of claim 3, wherein each of the at least one blade and the second blade or the pair of blades unfold automatically by centrifugal force, when changing from the road-configuration to the flight-configuration and each of the at least one blade and the second blade or the pair of blades fold automatically by a biassing force when changing from the flight-configuration to the road-configuration.

6. The vehicle of claim 1, wherein the vehicle control sub-system is configured to fold the at least one blade when changing from the flight-configuration to the road-configuration and unfold the at least one blade when changing from the road-configuration to the flight-configuration.

7. The vehicle of claim 1, wherein the vehicle control sub-system determines that each of the at least two rotors is in a parking state position using the at least one angular position sensor.

8. The vehicle of claim 1, wherein the at least two rotors are intermeshing rotors and counterrotating rotors, wherein a surface area S covered by the at least two rotors is represented by formula: $S=2*(\pi*(\text{the vehicle length}^2))$.

9. The vehicle of claim 1, wherein the front rotor is positioned at or proximal to the front end of the non-fixed wing roadable VTOL flying vehicle, and the rear rotor is positioned at the rear end of the non-fixed wing roadable VTOL flying vehicle;

the wingspan length is equal or proximal to the vehicle length of the non-fixed wing roadable VTOL flying vehicle; and the wingspan length is equal or proximal to a diagonal dimension of the non-fixed wing roadable VTOL flying vehicle, and the diagonal dimension is greater than the vehicle length of the non-fixed wing roadable VTOL flying vehicle.

10. The vehicle of claim 1, wherein each of the at least two rotors is coupled to a respective rotating motor configured to operatively rotate a respective rotor of the at least two rotors, wherein each of the at least two rotating-motors is coupled by a respective angular position sensor, and wherein the at least two rotors are either synchronous or asynchronous.

11. The vehicle of claim 10, wherein the at least two rotating-motors are driven by a controlled power source, and wherein the controlled power source includes:

a power control unit configured to monitor and coordinate electric power within the non-fixed wing roadable VTOL flying vehicle;

a rechargeable battery;

the power motor configured to supply the electric power to the non-fixed wing roadable VTOL flying vehicle; and an additional power source configured to drive the electric motor, wherein when in the flight-configuration, the power control unit is configured to direct the electric power from the power motor to the at least two rotating-motors.

12. The vehicle of claim 11, wherein the additional power source is configured to activate the power motor to thereby recharge the rechargeable battery.

13. The vehicle of claim 11, wherein when the additional power source is silent, the power control unit directs the rechargeable battery to provide the electric power.

14. The vehicle of claim 11, wherein when in the flight-configuration, the additional power source is configured to activate the power motor to thereby recharge the rechargeable battery and the additional power source is configured generate mechanical energy to drive the power motor.

15. The vehicle of claim 11, wherein the additional power source, the power motor and the rechargeable battery are configured to operate in a hybrid configuration.

16. The vehicle of claim 11 wherein the at least two rotors are configured to operate as intermeshing rotors.

17. The vehicle of claim 1, further comprising a parachute operable to be deployed in an emergency.

18. A non-fixed wing roadable Vertical Take-Off and Landing (VTOL) flying vehicle having a road-configuration and a flight-configuration, comprising:

a plurality of wheels, a width, a front end and a rear end, and a vehicle length defined between the front end and the rear end;

at least two rotors, each rotor having at least one blade and a wingspan length defined between the at least two rotors that does not exceed the vehicle length, wherein the at least two rotors are rotatably attached to an upper section of the non-fixed wing roadable VTOL flying vehicle;

at least two rotating-motors, each of the at least two rotating-motors configured to operatively rotate one of the at least two rotors in the flight-configuration;

at least one angular position sensor configured to detect an angular position of each of the at least two rotors; and a power motor configured to operatively rotate wheels of the non-fixed wing roadable VTOL flying vehicle via a gear unit directly coupled to the wheels in the road-configuration;

wherein each of the at least two rotors includes a front rotor and a rear rotor positioned in a tandem configuration;

wherein each of the at least one blade, in the flight-configuration, are operatively positioned in an overlapping configuration, controlled by the at least one angular position sensor, and wherein the non-fixed wing roadable VTOL flying vehicle is configured to:
automatically transform from the road-configuration to the flight-configuration and from the flight-configuration to the road-configuration, and
bring the at least two rotors into a parking state when in the road-configuration, and when the at least two rotors are in the parking state, each of the at least one blade is positioned within a vertical space situated above the non-fixed wing roadable VTOL flying vehicle, and within an area defined by the width and the vehicle length of the non-fixed wing roadable VTOL flying vehicle.

* * * * *